United States Patent
Raif (10) Patent No.: US 9,317,968 B2
(45) Date of Patent: Apr. 19, 2016

(54) SYSTEM AND METHOD FOR MULTIPLE HYPOTHESES TESTING FOR SURFACE ORIENTATION DURING 3D POINT CLOUD EXTRACTION FROM 2D IMAGERY

(71) Applicant: Raytheon Company, Waltham, MA (US)

(72) Inventor: Stephen J. Raif, Richardson, TX (US)

(73) Assignee: Raytheon Company, Waltham, MA (US)

(*) Notice: Subject to any disclaimer, the term of this patent is extended or adjusted under 35 U.S.C. 154(b) by 361 days.

(21) Appl. No.: 14/059,812

(22) Filed: Oct. 22, 2013

(65) Prior Publication Data
US 2014/0111511 A1 Apr. 24, 2014

Related U.S. Application Data

(60) Provisional application No. 61/717,364, filed on Oct. 23, 2012.

(51) Int. Cl.
| | |
|---|---|
| *G06T 17/00* | (2006.01) |
| *G06T 7/00* | (2006.01) |
| *G06K 9/00* | (2006.01) |

(52) U.S. Cl.
CPC ............ *G06T 17/00* (2013.01); *G06K 9/00637* (2013.01); *G06T 7/0071* (2013.01)

(58) Field of Classification Search
None
See application file for complete search history.

(56) References Cited

U.S. PATENT DOCUMENTS

| | | | | |
|---|---|---|---|---|
| 2010/0315412 | A1* | 12/2010 | Sinha | G06T 15/00 345/419 |
| 2012/0314037 | A1* | 12/2012 | Nehmadi | G01C 11/06 348/48 |
| 2013/0060540 | A1* | 3/2013 | Frahm | G06T 15/06 703/2 |

OTHER PUBLICATIONS

"Automatic line matching and 3D reconstruction of buildings from multiple views" (ISPRS Conference on Au-tomatic Extraction of GIS Objects from Digital Imagery, Sep. 1999, Munich, Germany. 32, Part 3-2W5, pp. 69-80, International Archives of Photogrammetry and Remote Sensing. <inria-00590111>.*
Visual Feature Integration and the Temporal Correlation Hypothesis (Wolf Singer Max Planck Institute for Brain Research,Deutschordenstrasse 46 , 6000 Frankfurt, Germany). "Visual feature integration and the temporal correlation hypothesis." Annual review of neuroscience 18.1 (1995): 555-586.*

* cited by examiner

*Primary Examiner* — Mark Zimmerman
*Assistant Examiner* — Nurun N Flora
(74) *Attorney, Agent, or Firm* — Schwegman Lundberg & Woessner, P.A.

(57) ABSTRACT

The system and methods described herein operate on a plurality of images that include multiple views of the same scene, typically from slightly different viewing angles and/or lighting conditions. One of the images is selected as a reference image. For each image ray in a non-reference image, the system and methods resample a local region from the non-reference image's space to the reference image's space. The resampling is performed multiple times, each time with a different surface orientation hypothesis. The system and methods run cross-correlation style correlators on the resampled images, evaluate correlation scores for each of the resampled images, and select the surface orientation hypothesis associated with the highest correlation score. The system and methods project a peak of the correlation surface back through a geometry model for the selected surface orientation hypothesis to determine a three-dimensional (ground) location for the image ray.

14 Claims, 6 Drawing Sheets

SYSTEM AND METHOD FOR MULTIPLE HYPOTHESES TESTING FOR SURFACE ORIENTATION DURING 3D POINT CLOUD EXTRACTION FROM 2D IMAGERY

CROSS-REFERENCE TO RELATED APPLICATIONS

This application claims the benefit of U.S. Provisional Application No. 61/717,364, filed Oct. 23, 2012, titled "System And Method For Multiple Hypotheses Testing For Surface Orientation During 3D Point Cloud Extraction From 2D Imagery".

GOVERNMENT LICENSE RIGHTS

This invention was made with Government support under Contract 08-C-3104. The Government has certain rights in this invention.

TECHNICAL FIELD

Examples pertain to extraction of a three-dimensional point cloud from two-dimensional imagery.

BACKGROUND

Conventional structure-from-motion algorithms that utilize cross-correlation style tiepoint generators resample the imagery into a common projection by using the current best knowledge of the terrain. The conventional algorithms can effectively identify features whose surface orientation matches the terrain, such as the ground or the tops of buildings. However, the conventional algorithms have difficulty identifying vertical features, such as telephone poles.

SUMMARY

The system and methods described herein operate on a plurality of images that include multiple views of the same scene, typically from slightly different viewing angles and/or lighting conditions. One of the images is selected as a reference image. For each image ray in a non-reference image, the system and methods resample a local region from the non-reference image's space to the reference image's space. The resampling is performed multiple times, each time with a different surface orientation hypothesis. The system and methods run cross-correlation style correlators on the resampled images, evaluate correlation scores for each of the resampled images, and select the surface orientation hypothesis associated with the highest correlation score. The system and methods project a peak of the correlation surface back through a geometry model for the selected surface orientation hypothesis to determine a three-dimensional (ground) location for the image ray.

In some examples, the ground space intersection location is based on a current surface orientation hypothesis. This feature, and the system and methods that use this feature, may advantageously allow for more accurate mapping of vertical features, such as telephone poles.

This summary is intended to provide an overview of subject matter of the present patent application. It is not intended to provide an exclusive or exhaustive explanation of the invention. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
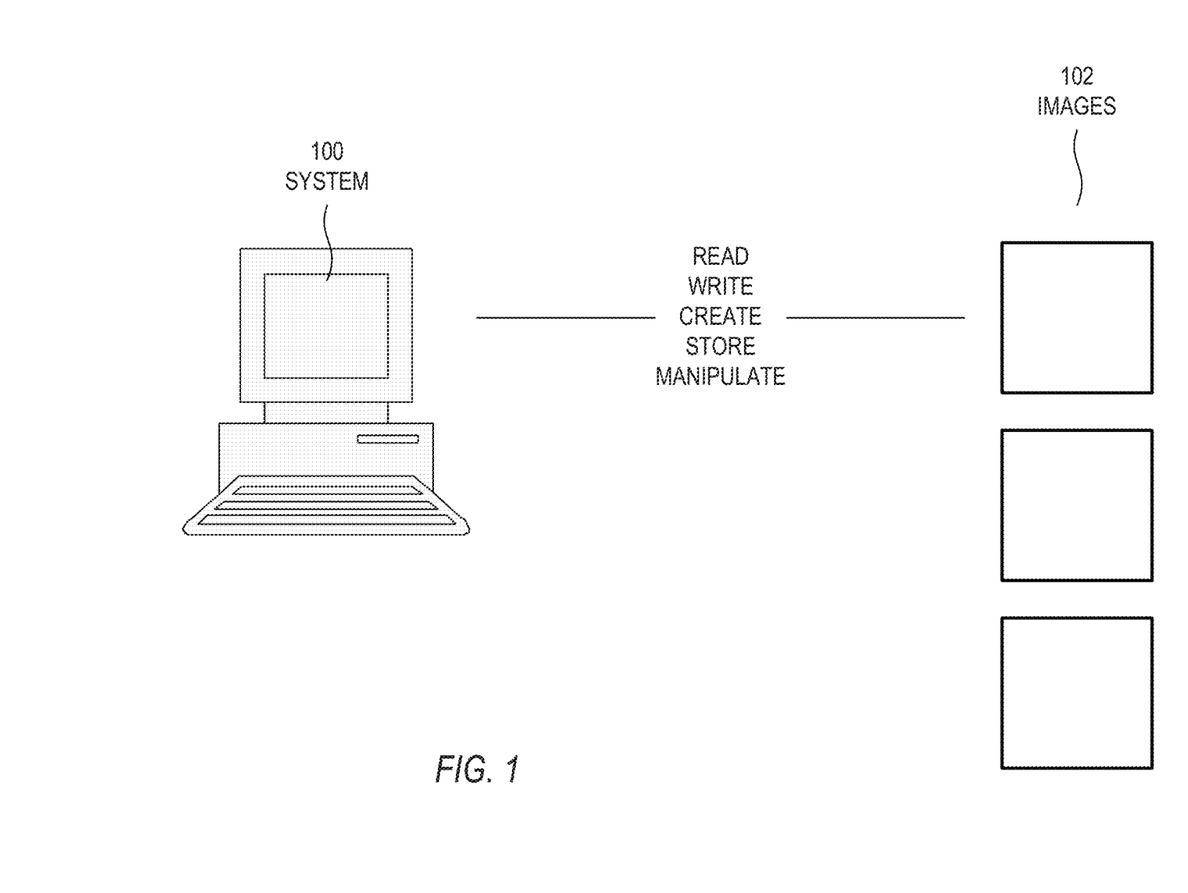
FIG. 1 is a schematic drawing of an example of a system that automatically extracts three-dimensional points from a plurality of images that include multiple views of the same scene, typically from slightly different viewing angles and/or lighting conditions, in accordance with some embodiments.

FIG. 1 is a schematic drawing of an example of a system 100 that automatically extracts three-dimensional points from a plurality of images that include multiple views of the same scene, typically from slightly different viewing angles and/or lighting conditions, in accordance with some embodiments. The system 100 can read, write, create, store, and/or manipulate images 102. The system 100 can perform calculations based on the images 102, which can include summing, thresholding, convolving, and other suitable image processing operations. The images 102 can be stored locally or on a network. Two or more images 102 can depict the same particular scene or object, as viewed from different angles. In some examples, the system 100 only reads images 102, and from the images 102, compiles a list of three-dimensional points; in these examples, the system 100 does not write or manipulate the images 102.

The system 100 can be a computer system that includes hardware, firmware and software. Examples may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some examples, computer systems can include one or more processors, optionally connected to a network, and may be configured with instructions stored on a computer-readable storage device.

Figure 2:
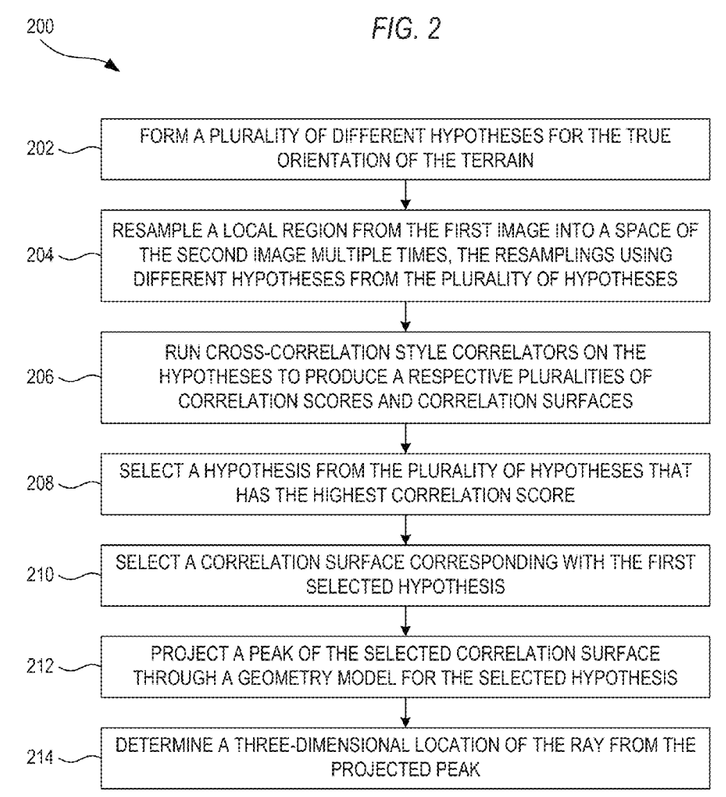
FIG. 2 is a flow chart of an example of a method for extracting a single three-dimensional point that represents a feature on the ground with a previously unknown surface orientation, in accordance with some embodiments.

FIG. 2 is a flow chart of an example of a method 200 for extracting a single three-dimensional point that represents a feature on the ground with a previously unknown surface orientation, in accordance with some embodiments. The three-dimensional point is extracted from first and second images. The first and second images are two-dimensional representations of the terrain from different viewing angles. The method 200 can be executed on any suitable system, including the system 100 of FIG. 1. The method 200 can be applied for each image ray in the first image. In some examples, the method 200 can be applied to two, three, four, or more than four images; using multiple images to extract the three-dimensional points can increase the reliability of the extraction.

Step 202 forms a plurality of different hypotheses for the true orientation of the terrain. A first example of a hypothesis is flat terrain, where the terrain has a constant elevation based on a current understanding of the elevation of the center of the search area. A second example of a hypothesis is interpolated terrain, where each pixel in search space is resampled into template space using a current understanding of the elevation for that pixel. A third example of a hypothesis is vertical terrain. In vertical terrain, each pixel in search space is resampled into template space assuming that the center of the template window is at an elevation based on a current understanding of the elevation for the search area. In vertical terrain, all other pixels in the template window form a vertical wall. A surface normal to the vertical wall has an azimuth angle equal to a line-of-sight ray azimuth. This vertical orientation maximizes correlation scores for vertical walls that are viewed from head-on, e.g., semi-orthogonal to the reference line of sight. As a result, the correlation score weakens as the wall angle turns parallel to the image rays. As the wall angle becomes increasingly parallel to the image rays, the system can extract data for these walls using images in which the wall is seen head on rather than an oblique angle.

Step 204 resamples a local region from the first image into a space of the second image multiple times. The resamplings use different hypotheses from the plurality of hypotheses. Step 206 runs cross-correlation style correlators on the plurality of hypotheses to produce respective pluralities of correlation scores and correlation surfaces. Step 208 selects a hypothesis from the plurality of hypotheses that has the highest correlation score. Step 210 selects a correlation surface corresponding with the selected hypothesis. Step 212 projects a peak of the selected correlation surface through a geometry model for the selected hypothesis. Step 214 determines a three-dimensional location of the ray from the projected peak. FIG. 2 shows one example of a method for extracting a single three-dimensional point that represents a feature on the ground with a previously unknown surface orientation; other suitable methods may also be used.

Figure 3:
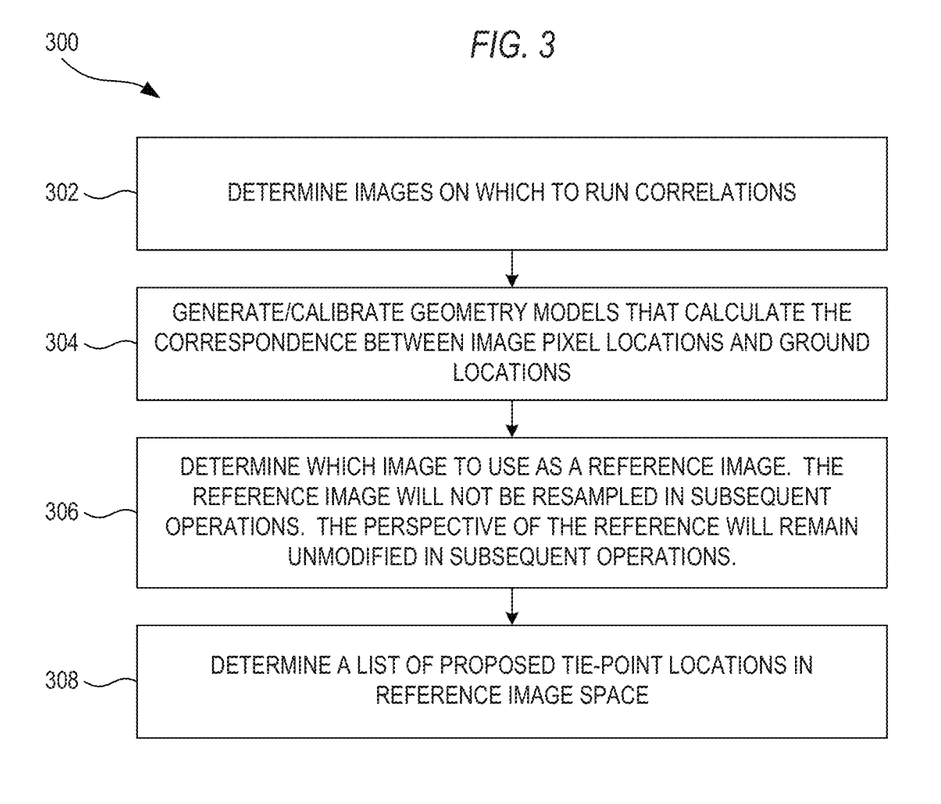
FIG. 3 is a flow chart of an example of pre-processing method for an example of a surface orientation technique that uses multiple hypothesis testing in accordance with some embodiments.

FIG. 3 is a flow chart of an example of pre-processing method 300 for an example of a surface orientation technique that uses multiple hypothesis testing in accordance with some embodiments. Step 302 determines images on which to run correlations. Step 304 generates and/or calibrates geometry models that calculate the correspondence between image pixel locations and ground locations. Step 306 determines which of the images to use as a reference image. The reference image will not be resampled in subsequent operations, and the perspective of the reference image will remain unmodified in subsequent operations. Other, non-reference, images can be resampled downstream. The perspective of the non-reference images can also be modified downstream. Step 308 determines a list of proposed tie-point locations in the space of the reference image. The reference image and the tie-point locations are used in subsequent steps. FIG. 3 shows one example for pre-processing tasks; other suitable pre-processing tasks may also be used.

Figure 4:
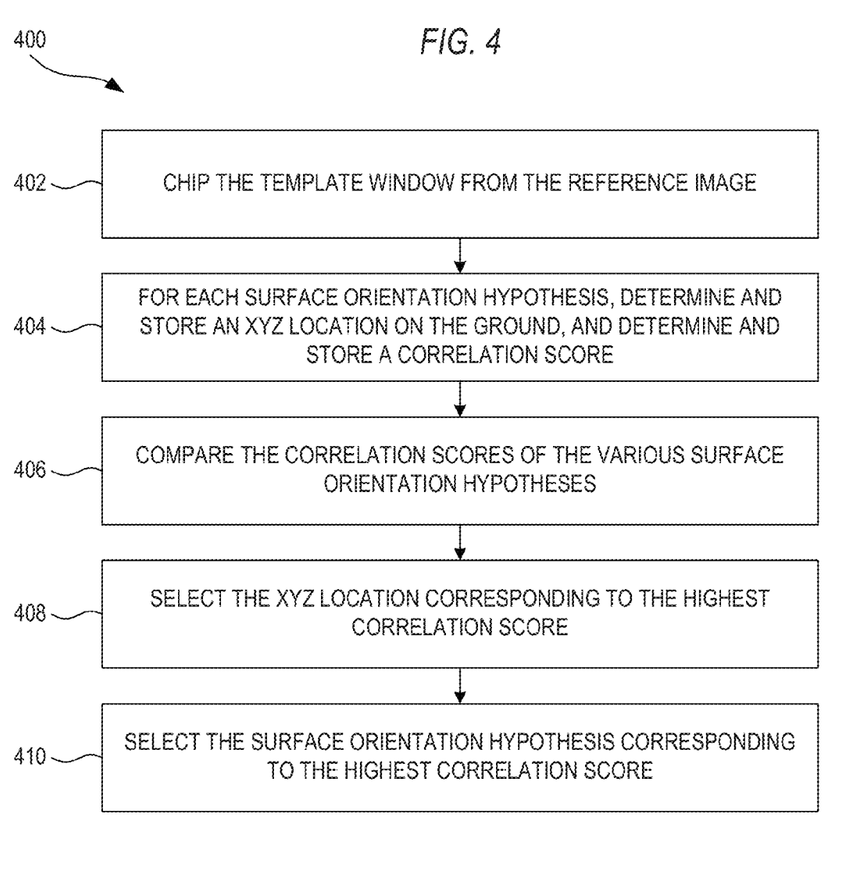
FIG. 4 is a flow chart of an example of a method for the example of a surface orientation technique that uses multiple hypothesis testing in accordance with some embodiments.

FIG. 4 is a flow chart of an example of a method 400 for the example of a surface orientation technique that uses multiple hypothesis testing in accordance with some embodiments. The system 100, or any other suitable system, can execute the method 400 independently for each proposed tie-point location returned from step 308 of FIG. 3. Step 402 chips a template window from the reference image. The reference image can be returned from the pre-processing method of FIG. 3. Step 404 determines and stores an XYZ location on the ground, for each surface orientation hypothesis. Step 404 also determines and stores a corresponding correlation score, for each surface orientation hypothesis. In some examples, surface orientation hypotheses can include a horizontal surface, multiple orientations of vertical or sloped surfaces, and/or an interpolated terrain model. For example, if there are three surface orientation hypotheses, which produce three guess of the true orientation of the intersected terrain, then step 404 is run three times, three corresponding XYZ locations on the ground are stored, and three corresponding correlation scores are stored. Step 406 compares the correlation scores of the various surface orientation hypotheses. Step 408 selects the XYZ location corresponding to the highest correlation score. Step 410 selects the surface orientation hypothesis corresponding to the highest correlation score. FIG. 4 shows one example of a surface orientation technique that uses multiple hypothesis testing; other suitable techniques may also be used.

Figure 5:
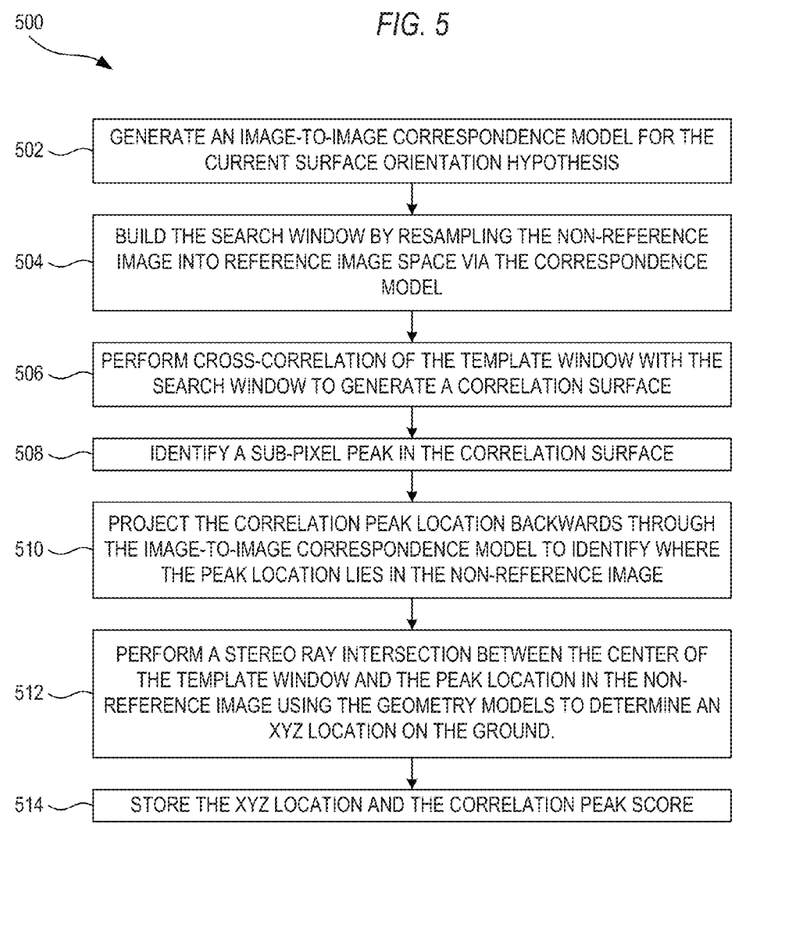
FIG. 5 is a flow chart of an example of a method for determining and storing an XYZ location on the ground, and determining and storing a corresponding correlation score in accordance with some embodiments.

FIG. 5 is a flow chart of an example of a method 500 for determining and storing an XYZ location on the ground, and determining and storing a corresponding correlation score in accordance with some embodiments. In some examples, the method 500 can flesh out the step 404 from FIG. 4. The system 100, or any other suitable system, can execute the method 500 independently for each proposed tie-point location returned from step 308 of FIG. 3, for each surface orientation hypothesis. Step 502 generates an image-to-image correspondence model for the current surface orientation hypothesis. Step 504 builds the search window by resampling the non-reference image into reference image space via the correspondence model. Step 506 performs cross-correlation of the template window with the search window to generate a correlation surface. Step 508 identifies a sub-pixel peak in the correlation surface. Step 510 projects the correlation peak location backwards through the image-to-image correspondence model to identify where the peak location lies in the non-reference image. Step 512 performs a stereo ray intersection between the center of the template window and the peak location in the non-reference image using the geometry models to determine an XYZ location on the ground. Step 514 stores the XYZ location and the correlation peak score. FIG. 5 shows one example of a method for determining and storing an XYZ location on the ground, and determining and storing a corresponding correlation score; other suitable methods may also be used.

Figure 6:
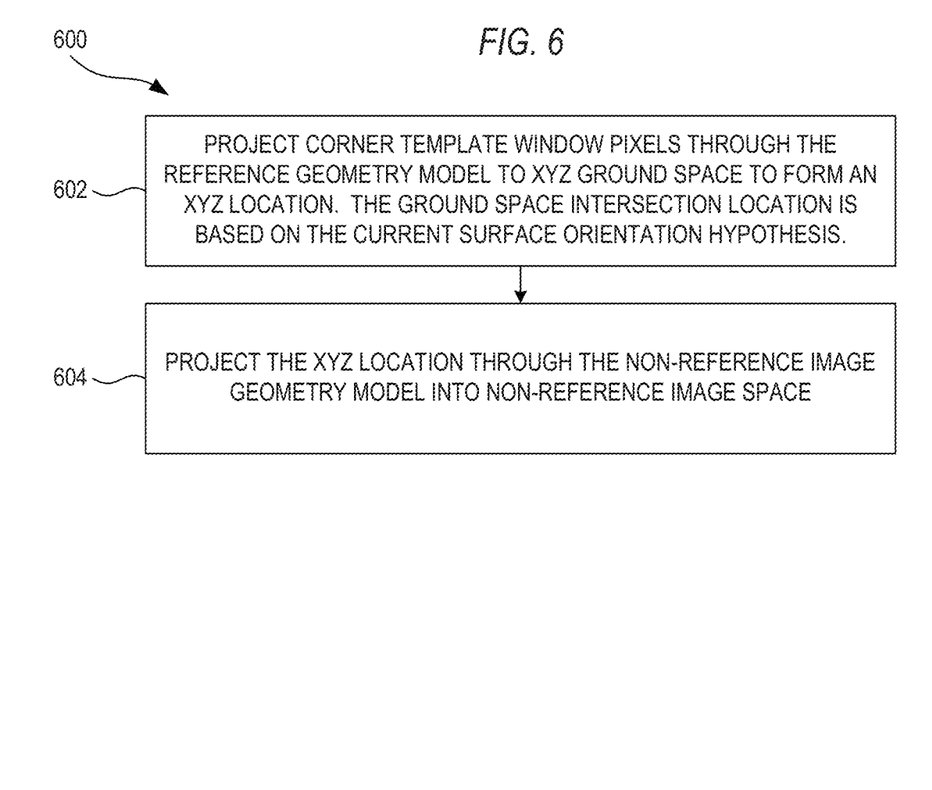
FIG. 6 is a flow chart of an example of a method for generating an image-to-image orientation hypothesis in accordance with some embodiments.

FIG. 6 is a flow chart of an example of a method 600 for generating an image-to-image orientation hypothesis in accordance with some embodiments. In some examples, the method 600 can flesh out the step 502 from FIG. 5. The system 100, or any other suitable system, can execute the method 600 independently for each proposed tie-point location returned from step 308 of FIG. 3, for each surface orientation hypothesis. Step 602 projects corner template window pixels through the reference geometry model to XYZ ground space to form an XYZ location. FIG. 6 shows one example of a method for generating an image-to-image orientation hypothesis; other suitable methods may also be used. The ground space intersection location is based on the current surface orientation hypothesis. Step 604 projects the XYZ location through the non-reference image geometry model into non-reference image space. For small templates and search areas, the correspondence model can be a four-corner bilinear interpolation mapper. Other suitable correspondence models can also be used.

What is claimed is:

1. A system for extracting a plurality of three-dimensional points that represent a terrain, the three-dimensional points being extracted from first and second images, the first and second images being two-dimensional representations of the terrain generated from different viewing angles, the system comprising processing circuitry arranged to, for each ray in the first image:
    form a plurality of different hypotheses for a true orientation of the terrain;
    resample a local region from the first image into a space of the second image multiple times, each of the resamplings using a different one of the hypotheses from the plurality of hypotheses;
    run cross-correlation style correlators on the plurality of hypotheses to produce respective pluralities of correlation scores and correlation surfaces;
    select a hypothesis from the plurality of hypotheses that has the highest correlation score;
    select a correlation surface corresponding with the selected hypothesis;
    project a peak of the selected correlation surface through a geometry model for the selected hypothesis; and
    determine a three-dimensional point representing a location of the ray from the projected peak.

2. The system of claim 1,
    wherein a first hypothesis, of the plurality of hypotheses, includes flat terrain; and
    wherein the first hypothesis uses a constant elevation based on a current understanding of an elevation of a center of a search area.

3. The system of claim 1,
    wherein a second hypothesis, of the plurality of hypotheses, includes interpolated terrain; and
    wherein for the second hypothesis, each pixel in a search space is resampled into a template space using a current understanding of an elevation for the respective pixel.

4. The system of claim 1,
    wherein a third hypothesis, of the plurality of hypotheses, includes vertical terrain; and
    wherein for the third hypothesis, each pixel in a search space is resampled into a template space assuming that a center of a template window is at an elevation based on a current understanding of an elevation for a search area.

5. The system of claim 1, wherein the processing circuitry is further arranged to, prior to forming a plurality of different hypotheses:
    determine a plurality of images on which to run correlations;
    generate and calibrate geometry models that calculate correspondences between image pixel locations and ground locations;
    determine which image, of the plurality of images, to use as a reference image; and
    determining a plurality of proposed tie-point locations in reference image space.

6. A system for extracting a plurality of best-guess ground locations of tie-points that represent a terrain, the tie-points being extracted from a reference image and a non-reference image, the reference and non-reference images being two-dimensional representations of the terrain generated from different viewing angles, the system comprising processing circuitry arranged to, for each tie-point:
    for each of a plurality of different hypotheses, determine and store a trial ground location;
    for each of the plurality of different hypotheses, determine and store a correlation score;
    compare the correlation scores of the plurality of different hypotheses;
    select a trial ground location, of the stored trial ground locations, that corresponds to the highest correlation score;
    select a hypothesis, of the plurality of different hypotheses, that corresponds to the highest correlation score; and
    for the selected hypothesis, project a peak of a respective correlation surface through a respective geometry model to determine the best-guess ground location of the tie-point.

7. The system of claim 6, wherein the processing circuitry is further arranged to, for each of the plurality of different hypotheses:
    generate an image-to-image correspondence model;
    build a search window by resampling the non-reference image into reference image space via the correspondence model;
    chip a template window from the reference image;
    perform cross-correlation of the template window with the search window to generate a correlation surface;
    identify a sub-pixel peak in the correlation surface;
    project a location of the sub-pixel peak through the correspondence model to identify a location of the sub-pixel peak in the non-reference image;
    perform a stereo ray intersection between a center of the template window and the location of the sub-pixel peak in the non-reference image to determine and store a corresponding ground location and a corresponding correlation score.

8. The system of claim 7, wherein generating an image-to-image correspondence model comprises:
    projecting corner template window pixels through a reference geometry model to ground space to form a ground location, wherein the ground location is based on a current hypothesis; and
    projecting the ground location through a non-reference geometry model into non-reference image space.

9. A non-transitory computer-readable storage medium storing a program for causing a computer to implement a method for extracting a plurality of ground locations of tie-points that represent a terrain, the tie-points being extracted from a reference image and a non-reference image, the reference and non-reference images being two-dimensional representations of the terrain generated from different viewing angles, the method comprising, for each tie-point:
    chipping a template window from the reference image;
    for each of a plurality of different hypotheses, determining and storing a guessed ground location;
    for each of the plurality of different hypotheses, determining and storing a correlation score;
    comparing the correlation scores of the plurality of different hypotheses;
    selecting a guessed ground location, of the stored guessed ground locations, that corresponds to the highest correlation score;
    selecting a hypothesis, of the plurality of different hypotheses, that corresponds to the highest correlation score; and
    for the selected hypothesis, projecting a peak of a respective correlation surface through a respective geometry model to determine the ground location of the tie-point.

10. The non-transitory computer-readable storage medium of claim 9,
  wherein a first hypothesis, of the plurality of hypotheses, includes flat terrain; and
  wherein the first hypothesis uses a constant elevation based on a current understanding of an elevation of a center of a search area.

11. The non-transitory computer-readable storage medium of claim 9,
  wherein a second hypothesis, of the plurality of hypotheses, includes interpolated terrain; and
  wherein for the second hypothesis, each pixel in a search space is resampled into a template space using a current understanding of an elevation for the respective pixel.

12. The non-transitory computer-readable storage medium of claim 9,
  wherein a third hypothesis, of the plurality of hypotheses, includes vertical terrain; and
  wherein for the third hypothesis, each pixel in a search space is resampled into a template space assuming that a center of a template window is at an elevation based on a current understanding of an elevation for a search area.

13. The non-transitory computer-readable storage medium of claim 9, the method further comprising, for each of the plurality of different hypotheses:
  generating an image-to-image correspondence model;
  building a search window by resampling the non-reference image into reference image space via the correspondence model;
  performing cross-correlation of the template window with the search window to generate a correlation surface;
  identifying a sub-pixel peak in the correlation surface;
  projecting a location of the sub-pixel peak through the correspondence model to identify a location of the sub-pixel peak in the non-reference image;
  performing a stereo ray intersection between a center of the template window and the location of the sub-pixel peak in the non-reference image to determine and store a corresponding ground location and a corresponding correlation score.

14. The non-transitory computer-readable storage medium of claim 13, wherein generating an image-to-image correspondence model comprises:
  projecting corner template window pixels through a reference geometry model to ground space to form a ground location, wherein the ground location is based on a current hypothesis; and
  projecting the ground location through a non-reference geometry model into non-reference image space.

\* \* \* \* \*